US009796311B2

(12) United States Patent
Veik et al.

(10) Patent No.: US 9,796,311 B2
(45) Date of Patent: Oct. 24, 2017

(54) ALL-WEATHER FLOOR MAT WITH CONNECTING LINER INTERLOCKING FEATURE

(71) Applicant: GM GLOBAL TECHNOLOGY OPERATIONS LLC, Detroit, MI (US)

(72) Inventors: Kevin J. Veik, Howell, MI (US); Wendy E. Zaranek, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/831,917

(22) Filed: Aug. 21, 2015

(65) Prior Publication Data

US 2016/0229323 A1    Aug. 11, 2016

Related U.S. Application Data

(60) Provisional application No. 62/112,293, filed on Feb. 5, 2015.

(51) Int. Cl.
*B60N 3/04* (2006.01)

(52) U.S. Cl.
CPC ............ *B60N 3/046* (2013.01); *B60N 3/044* (2013.01); *B60N 3/048* (2013.01)

(58) Field of Classification Search
CPC .......... B60N 3/04; B60N 3/044; B60N 3/046; B60N 3/048
USPC ...................................................... 296/97.23
See application file for complete search history.

(56) References Cited

U.S. PATENT DOCUMENTS

| | | | | | |
|---|---|---|---|---|---|
| 2,970,860 | A | * | 2/1961 | Belk | B60N 3/044 296/97.23 |
| 3,014,754 | A | * | 12/1961 | Thurkow | B60N 3/044 15/215 |
| 3,337,258 | A | * | 8/1967 | Steinberg | B60N 3/04 296/97.23 |
| 3,401,975 | A | * | 9/1968 | Oger | B60N 3/044 296/97.23 |
| 3,488,081 | A | * | 1/1970 | Nolen | B60N 3/044 15/215 |

(Continued)

FOREIGN PATENT DOCUMENTS

| | | |
|---|---|---|
| CN | 102555874 B | 4/2014 |
| CN | 104039595 A | 9/2014 |
| JP | 2000006705 A | 1/2000 |

*Primary Examiner* — Gregory Blankenship
(74) *Attorney, Agent, or Firm* — Quinn IP Law

(57) ABSTRACT

A removable protective floor liner for a rearward seating area of a passenger compartment of a vehicle includes a first floor mat section including a first flap section that is configured for installation in a first foot well of the passenger compartment and a second floor mat section including a second flap section that is configured for installation in a second foot well of the passenger compartment. The first flap includes an overlapping portion and a plurality of female interlocking fasteners and the second flap includes an underlapping portion and a plurality of male interlocking fasteners, including the underlapping portion extending a predetermined distance beyond the male interlocking fasteners. The first and second flaps cover a tunnel area intervening between the first and second floor mat sections. The male interlocking fasteners are joined with corresponding ones of the female interlocking fasteners when the first and second flaps are aligned.

4 Claims, 4 Drawing Sheets

(56) References Cited

U.S. PATENT DOCUMENTS

| | | | |
|---|---|---|---|
| 4,741,065 A | 5/1988 | Parkins | |
| 4,968,548 A * | 11/1990 | Gibson | A47G 27/0437 |
| | | | 15/215 |
| 5,830,560 A * | 11/1998 | Koa | B60N 3/044 |
| | | | 296/97.23 |
| 5,876,826 A * | 3/1999 | Hoffmann | B60N 3/042 |
| | | | 156/72 |
| 5,891,546 A * | 4/1999 | Sherman | A47G 27/0412 |
| | | | 15/217 |
| 6,102,464 A * | 8/2000 | Schneider | B62D 43/10 |
| | | | 296/37.3 |
| 8,163,369 B2 * | 4/2012 | Stanesic | B60N 3/044 |
| | | | 296/39.1 |
| 2004/0005430 A1 * | 1/2004 | Rogers | B32B 3/02 |
| | | | 428/44 |
| 2012/0061990 A1 * | 3/2012 | Dirnfeld | B32B 5/18 |
| | | | 296/97.23 |
| 2013/0260083 A1 * | 10/2013 | Price | B29C 45/14786 |
| | | | 428/95 |
| 2014/0300130 A1 * | 10/2014 | Morris | B62D 27/023 |
| | | | 296/97.23 |

* cited by examiner

ALL-WEATHER FLOOR MAT WITH CONNECTING LINER INTERLOCKING FEATURE

CROSS-REFERENCE TO RELATED APPLICATIONS

This application claims the benefit of U.S. Provisional Application No. 62/112,293, filed Feb. 5, 2015, which is hereby incorporated by reference in its entirety.

TECHNICAL FIELD

The present disclosure relates generally to flexible protective mats designed for use on floors, and more specifically to such mats used in motor vehicles.

BACKGROUND

Vehicle passenger compartments may be equipped with floor trays or mats that fit into foot wells and serve to protect underlying flooring, e.g., carpeting from exposure to liquids, dirt, debris and other elements that are tracked into the vehicle by passengers. Vehicle foot wells in both the front and rear seating areas are three-dimensional concave areas having complex curved shapes. Vehicle floor trays may include fitted sidewall portions to provide protective covering to the foot wells. Known three-dimensional floor trays may be molded from polymers having sufficient stiffness to retain the molded shape. Known floor mat systems may include an individual floor tray for each foot well in the front seating area and only provide a single-piece continuous floor tray that covers foot wells for both rear seats and an intervening tunnel area.

SUMMARY

A removable protective floor liner for a rearward seating area of a passenger compartment of a vehicle including a first foot well separated from a second foot well by an intervening tunnel is described, and includes a first floor mat section including a first flap section that is configured for installation in a first foot well of the passenger compartment and a second floor mat section including a second flap section that is configured for installation in a second foot well of the passenger compartment. The first flap includes an overlapping portion and a plurality of female interlocking fasteners and the second flap includes an underlapping portion and a plurality of male interlocking fasteners, including the underlapping portion extending a predetermined distance beyond the male interlocking fasteners. The first and second flaps cover a tunnel area intervening between the first and second floor mat sections. The male interlocking fasteners are joined with corresponding ones of the female interlocking fasteners when the first and second flaps are aligned.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
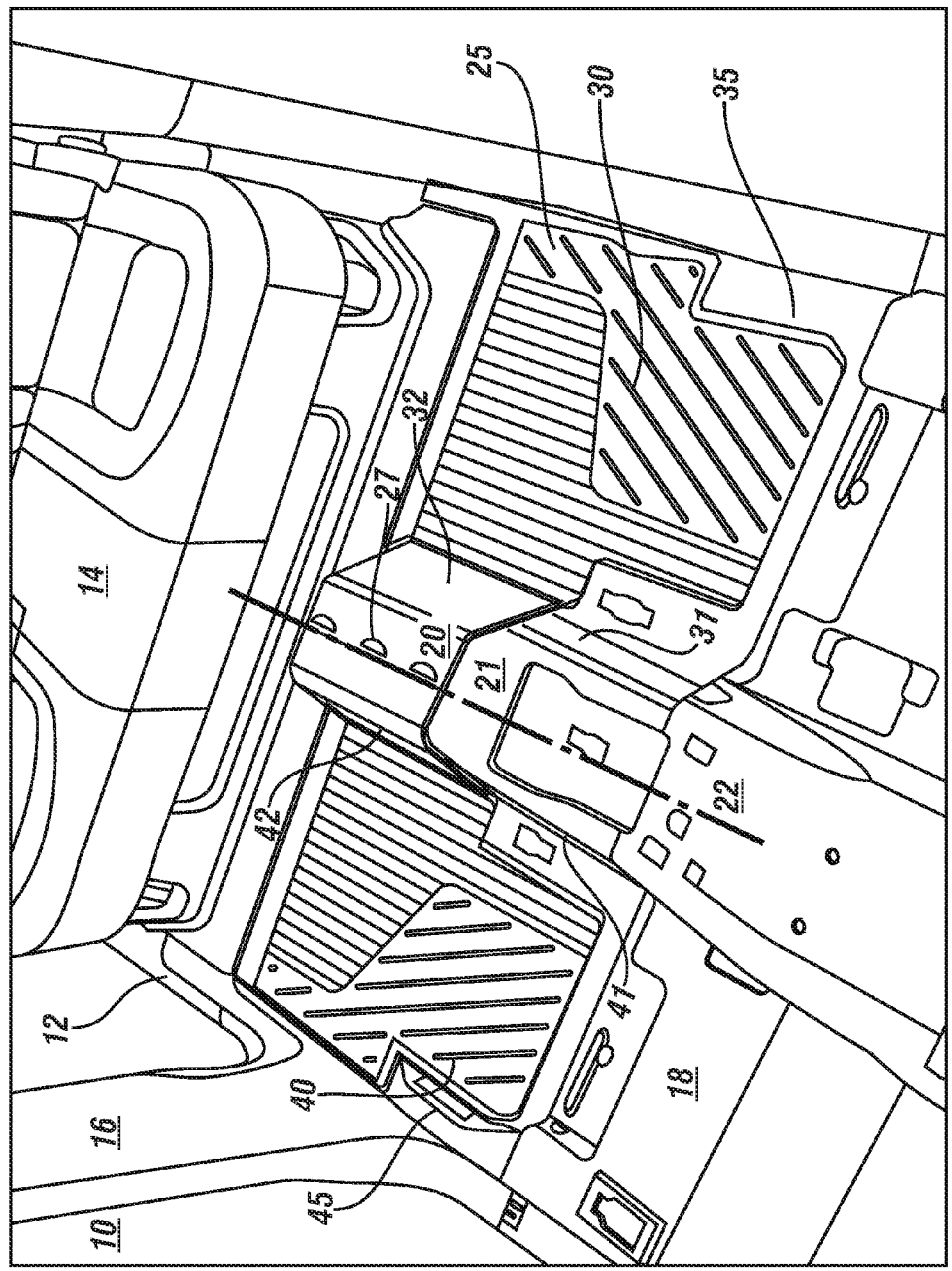
FIG. 1 schematically illustrates a partial cutaway isometric view of a passenger compartment of a vehicle, including a rear seat of a rearward seating area and a removable floor mat assembly, in accordance with this disclosure.

Referring now to the drawings, wherein the depictions are for the purpose of illustrating certain exemplary embodiments only and not for the purpose of limiting the same, FIG. 1 schematically illustrates a partial cutaway isometric view of a passenger compartment 12 of a vehicle 10, including a rear seat 14 of a rearward seating area. A body pillar 16 and floor pan 18 are shown for reference. A vehicle tunnel 20 runs longitudinally through this portion of the vehicle 10, separating a first, left foot well 35 and a second, right foot well 45. As described herein, the left side refers to a driver's side of the vehicle 10 and the right side refers to a front passenger's side of the vehicle 10. Like numerals indicate like elements in the various embodiments. The tunnel 20 includes a top portion 21 that runs on a horizontal plane in the vehicle, and left and right side portions 31 and 41, respectively, that run substantially vertically to the respective first, left foot well 35 and second, right foot well 45. A removable floor mat assembly 25 may be inserted into the passenger compartment 12 in front of the rear seat 14 on top of the floor pan 18 and any intervening carpeting or other permanently installed material to provide a protective, impermeable barrier over all or a portion thereof to prevent flow of material to the underlying floor pan 18.

The removable floor mat assembly 25 includes a left mat portion 30 including a left flap 32 and a right mat portion 40 including a right flap 42, with an outer portion of the left flap 32 aligned with and joined to a corresponding outer portion of the right flap 42. As shown in this embodiment, a seam 27 formed by the junction of the left and right flaps 32, 42 runs longitudinally with the vehicle tunnel 20 at a midline of the tunnel 20 or thereabouts, shown by centerline 22. The left mat portion 30 and the right mat portion 40 are both preferably fabricated from a water-impervious thermoplastic elastomeric material using injection molding or another suitable molding process. The left flap 32 includes a plurality of female interlocking fasteners that are formed as an integral part thereof during molding, and an overlap portion that extends beyond the female interlocking fasteners overtop of the right flap 42 by a predetermined distance, thus providing structural strength thereto and providing an impermeable barrier through the seam 27 over the portion of the floor pan 18 it covers.

As described with reference to the various embodiments shown with reference to FIGS. 2-10, the right flap 42 includes a plurality of male interlocking fasteners that are formed as an integral part thereof during molding, and an underlap portion that extends beyond the male interlocking fasteners underneath the left flap 32 by a predetermined distance, thus providing structural strength thereto and providing an impermeable barrier.

The male interlocking fasteners join with corresponding ones of the female interlocking fasteners when the left and right flaps 32, 42 are aligned, thus permitting the right flap 42 to be separated from the left flap 32. This separation permits removal of the left mat portion 30 from the left side of the vehicle 10, and removal of the right mat portion 40 from the right side of the vehicle 10 for cleaning and other functions. In each of the embodiments described herein, the female interlocking fasteners may be replaced with male interlocking fasteners, and correspondingly the male interlocking fasteners may be replaced with female interlocking fasteners.

Figure 2:
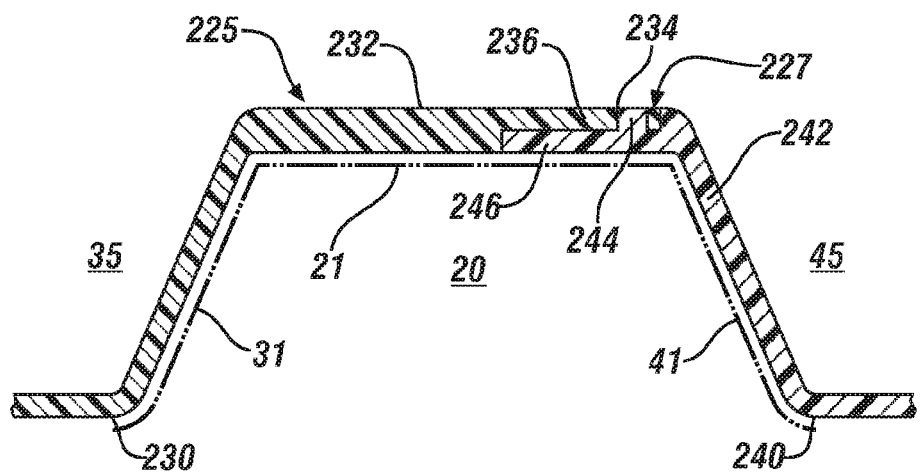
FIGS. 2 through 4 each schematically shows an end view of a portion of an embodiment of a removable floor mat assembly that includes a left mat portion including a left flap and a right mat portion including a right flap, with an outer portion of the left flap aligned with and joined to a corresponding outer portion of the right flap, in accordance with this disclosure.

FIG. 2 schematically shows an end view of a portion of an embodiment of the removable floor mat assembly 225, which includes a left mat portion 230 including a left flap 232 and a right mat portion 240 including a right flap 242, with an outer portion of the left flap 232 aligned with and joined to a corresponding outer portion of the right flap 242. The vehicle tunnel 20 including the top portion 21 and the left and right side portions 31 and 41, the first left foot well 35 and the second, right foot well 45 are shown for reference. As shown in this embodiment, a seam 227 formed by the junction of the left and right flaps 232, 242 runs longitudinally with the vehicle tunnel 20 on a horizontal portion thereof near the right side. In this embodiment, the left mat 230 includes left flap 232 and a plurality of female interlocking fasteners 234 that overlap and assemble onto corresponding male interlocking fasteners 244 of the right flap 242 of the right mat 240. The right flap 242 includes an underlap portion 246 that extends underneath a corresponding overlap portion 236 of the left flap 232. The left flap 232 extends to a right side of the top portion 21 of the tunnel 20, as is shown by the seam 227.

Figure 3:
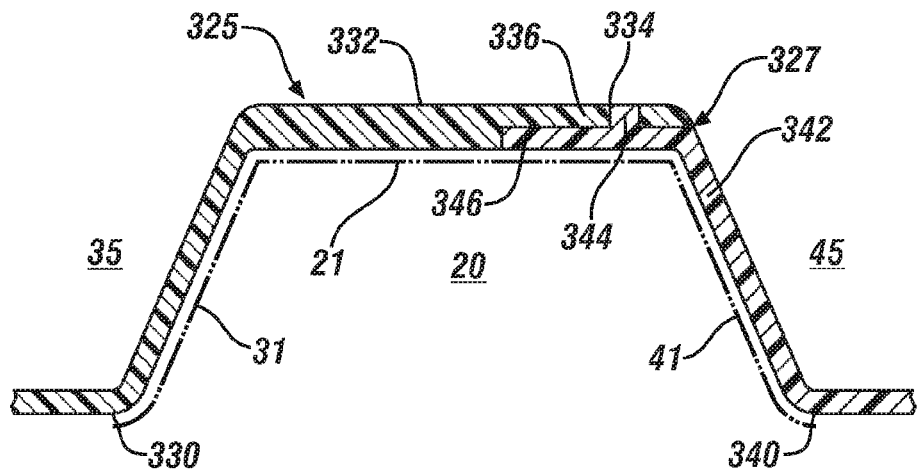

FIG. 3 schematically shows an end view of a portion of another embodiment of the removable floor mat assembly 325, which includes a left mat portion 330 including a left flap 332 and a right mat portion 340 including a right flap 342, with an outer portion of the left flap 332 aligned with and joined to a corresponding outer portion of the right flap 342. The vehicle tunnel 20 including the top portion 21 and the left and right side portions 31 and 41, the first, left foot well 35 and the second, right foot well 45 are shown for reference. As shown in this embodiment, a seam 327 formed by the junction of the left and right flaps 332, 342 runs longitudinally with the vehicle tunnel 20 on the right side. In this embodiment, the left mat 330 includes left flap 332 and a plurality of female interlocking fasteners 334 that overlap and assemble onto corresponding male interlocking fasteners 344 of the right flap 342 of the right mat portion 340. The right flap 342 includes an underlap portion 346 that extends underneath a corresponding overlap portion 336 of the left flap 332. The left flap 332 extends to a right side of the top portion 21 of the tunnel 20 and is flush with the right side portion 31 of the tunnel 20, as is shown by the seam 327, which is located on the vertical portion of the tunnel 20.

Figure 4:
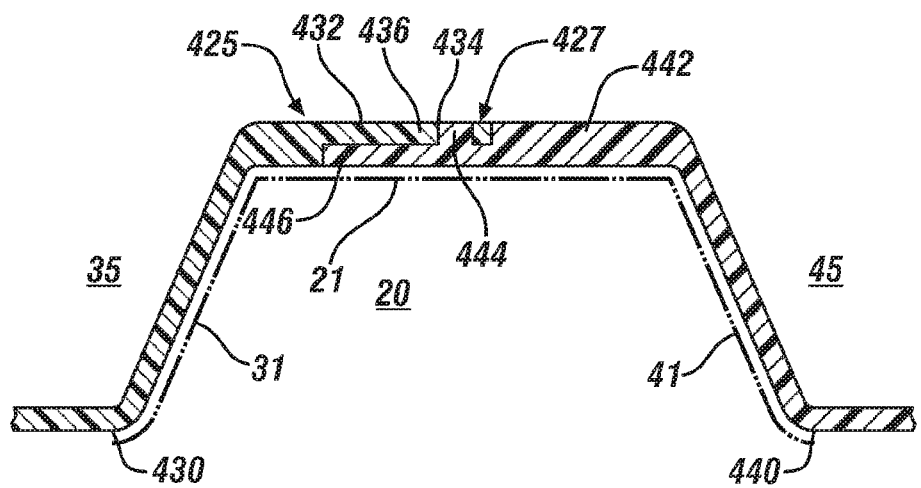

FIG. 4 schematically shows an end view of a portion of another embodiment of the removable floor mat assembly 425, which includes a left mat portion 430 including a left flap 432 and a right mat portion 440 including a right flap 442, with an outer portion of the left flap 432 aligned with and joined to a corresponding outer portion of the right flap 442. The vehicle tunnel 20 including the top portion 21 and the left and right side portions 31 and 41, the first, left foot well 35 and the second, right foot well 45 are shown for reference. This embodiment is analogous to the embodiment shown with reference to FIG. 1. As shown in this embodiment, a seam 427 formed by the junction of the left and right flaps 432, 442 runs longitudinally with the vehicle tunnel 20 in the center of the top portion 21 of the tunnel 20. In this embodiment, the left mat 430 includes left flap 432 and a plurality of female interlocking fasteners 434 that overlap and assemble onto corresponding male interlocking fasteners 444 of the right flap 442 of the right mat 440. The right flap 442 includes an underlap portion 446 that extends underneath a corresponding overlap portion 436 of the left flap 432.

Figure 5:
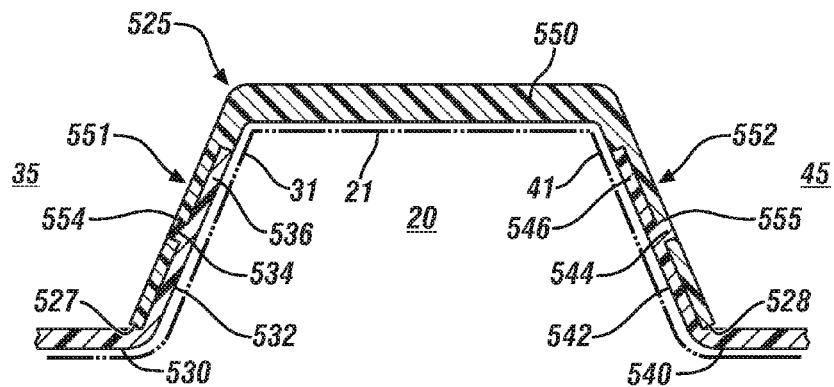
FIGS. 5 and 6 each schematically shows an end view of a portion of an embodiment of the removable floor mat assembly that includes a left mat portion including a left flap, a right mat portion including a right flap and a detachable interconnecting flap, in accordance with the disclosure.

FIG. 5 schematically shows an end view of a portion of another embodiment of the removable floor mat assembly 525, which includes a left mat portion 530 including a left flap 532, a right mat portion 540 including a right flap 542 and a detachable interconnecting flap 550. The vehicle tunnel 20 including the top portion 21 and the left and right side portions 31 and 41, the first, left foot well 35 and the second, right foot well 45 are shown for reference. The interconnecting flap 550 includes a first side 551 that aligns with an outer portion of the left flap 532 and a second side 552 that aligns with a corresponding outer portion of the right flap 542. The left flap 532 preferably extends up a vertical portion of a left side of the tunnel 20 to conjoin with the first side 551 of the interconnecting flap 550, and the right flap 542 preferably extends up a vertical portion of a right side of the tunnel 20 to conjoin with the second side 552 of the interconnecting flap 550. As shown in this embodiment, a first seam 527 is formed by the junction of the left flap 532 and the first side 551 of the interconnecting flap 550, and a second seam 528 is formed by the junction of the right flap 542 and the second side 552 of the interconnecting flap 550. The first and second seams 527, 528 run longitudinally with the vehicle tunnel 20 on the corresponding sides of the vertical portion of the tunnel 20. In this embodiment, the left mat 530 includes left flap 532 and a plurality of male interlocking fasteners 534 that underlap and assemble onto corresponding female interlocking fasteners 554 on the first side 551 of the interconnecting flap 550. The right mat portion 540 includes right flap 542 and a plurality of male interlocking fasteners 544 that underlap and assemble onto corresponding female interlocking fasteners 555 on the second side 552 of the interconnecting flap 550. The right flap 542 includes an underlap portion 546 that extends underneath the first side 551 of the interconnecting flap 550, and the left flap 532 includes an underlap portion 536 that extends underneath the second side 552 of the interconnecting flap 550.

Figure 6:
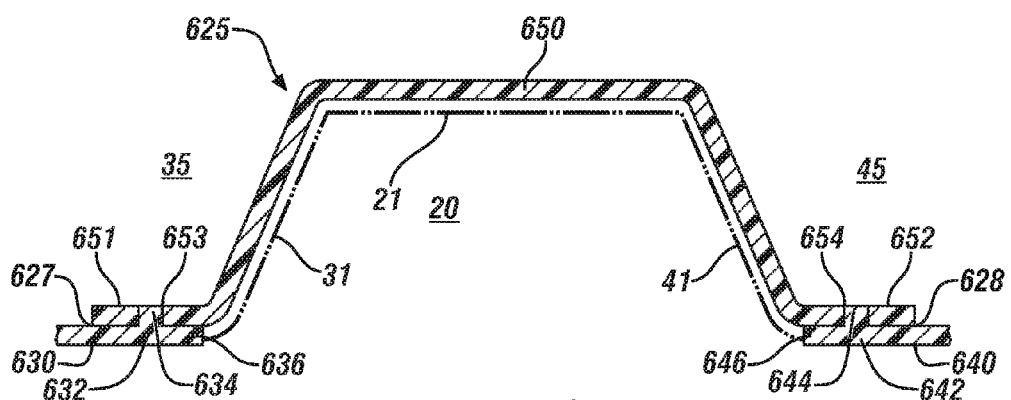

FIG. 6 schematically shows an end view of a portion of another embodiment of the removable floor mat assembly 625, which includes a left mat portion 630 including a left flap 632, a right mat portion 640 including a right flap 642 and a detachable interconnecting flap 650. The vehicle tunnel 20 including the top portion 21 and the left and right side portions 31 and 41, the first, left foot well 35 and the second, right foot well 45 are shown for reference. The interconnecting flap 650 includes a first side 651 that aligns with an outer portion of the left flap 632 and a second side 652 that aligns with a corresponding outer portion of the right flap 642. The left flap 632 preferably ends at or near a vertical portion of a left side of the tunnel 20 to conjoin with the first side 651 of the interconnecting flap 650, and the right flap 642 preferably ends at or near a vertical portion of a right side of the tunnel 20 to conjoin with the second side 652 of the interconnecting flap 650. As shown in this embodiment, a first seam 627 is formed by the junction of the left flap 632 and the first side 651 of the interconnecting flap 650, and a second seam 628 is formed by the junction of the right flap 642 and the second side 652 of the interconnecting flap 650. The first and second seams 627, 628 run longitudinally with the vehicle tunnel 20 on the corresponding sides. In this embodiment, the left mat 630 includes left flap 632 and a plurality of male interlocking fasteners 634 that underlap and assemble onto corresponding female interlocking fasteners 653 on the first side 651 of the interconnecting flap 650. The right mat 640 includes right flap 642 and a plurality of male interlocking fasteners 644 that underlap and assemble onto corresponding female interlocking fasteners 654 on the second side 652 of the interconnecting flap 650. The right flap 642 includes an underlap portion 646 that extends underneath the first side 651 of the interconnecting flap 650, and the left flap 632 includes an underlap portion 636 that extends underneath the second side 652 of the interconnecting flap 650.

Figure 7:
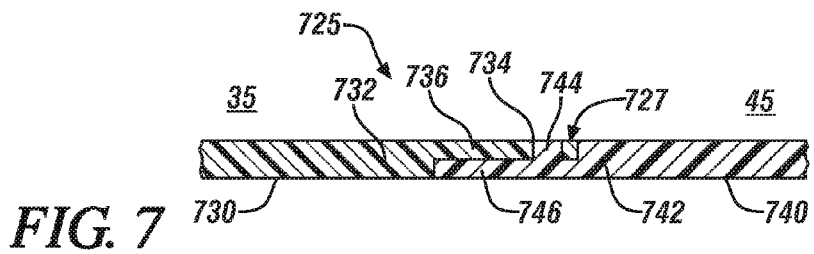
FIG. 7 schematically shows an end view of a portion of an embodiment of the removable floor mat assembly, which includes a left mat portion including a left flap and a right mat portion including a right flap and running on a horizontal plane in the vehicle, in accordance with the disclosure.

FIG. 7 schematically shows an end view of a portion of another embodiment of the removable floor mat assembly 725, which includes a left mat portion 730 including a left flap 732 and a right mat portion 740 including a right flap 742, with an outer portion of the left flap 732 aligned with and joined to a corresponding outer portion of the right flap 742. As shown in this embodiment, a seam 727 formed by the junction of the left and right flaps 732, 742 runs on a horizontal plane in the vehicle, such as when connecting floor mats from a forward seating area to floor mats in a rearward seating area. In this embodiment, the left mat 730 includes left flap 732 and a plurality of female interlocking fasteners 734 that overlap and assemble onto corresponding male interlocking fasteners 744 of the right flap 742 of the right mat portion 740. The right flap 742 includes an underlap portion 746 that extends underneath a corresponding overlap portion 736 of the left flap 732. The left flap 732 extends to and is flush with a vertical portion of the tunnel 20, as is shown by the seam 727.

Figure 8:
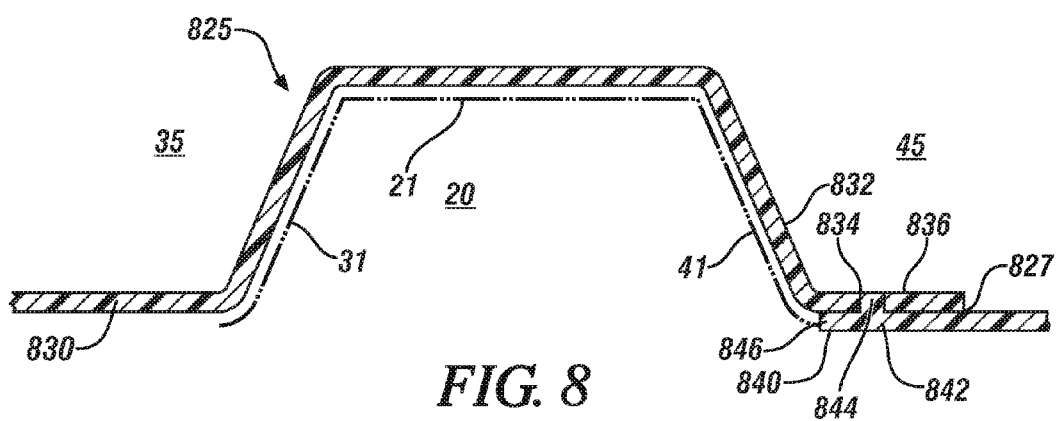
FIGS. 8 and 9 each schematically shows an end view of a portion of an embodiment of a removable floor mat assembly that includes a left mat portion including a left flap and a right mat portion including a right flap, with an outer portion of the left flap aligned with and joined to a corresponding outer portion of the right flap, in accordance with this disclosure.

FIG. 8 schematically shows an end view of a portion of another embodiment of the removable floor mat assembly 825, which includes a left mat portion 830 including a left flap 832 and a right mat portion 840 including a right flap 842, with an outer portion of the left flap 832 aligned with and conjoined to a corresponding outer portion of the right flap 842. The vehicle tunnel 20 including the top portion 21 and the left and right side portions 31 and 41, the first, left foot well 35 and the second, right foot well 45 are shown for reference. In this embodiment, the left flap 832 extends completely across the tunnel 20. As shown in this embodiment, a seam 827 formed by the junction of the left and right flaps 832, 842 runs longitudinally with the vehicle tunnel 20 at a junction of the tunnel 20 and the right mat portion 840.

In this embodiment, the left mat 830 includes left flap 832 and a plurality of female interlocking fasteners 834 that overlap and assemble onto corresponding male interlocking fasteners 844 of the right flap 842 of the right mat 840. The right flap 842 includes an underlap portion 846 that extends underneath a corresponding overlap portion 836 of the left flap 832.

Figure 9:
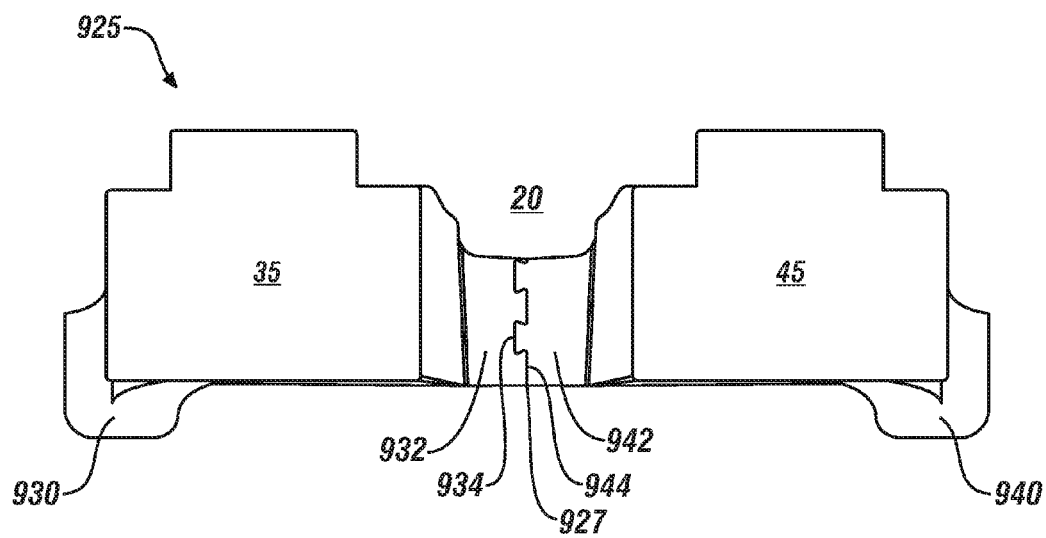

FIG. 9 schematically shows an end view of a portion of another embodiment of the removable floor mat assembly 925, which includes a left mat portion 930 including a left flap 932 and a right mat portion 940 including a right flap 942, with an outer portion of the left flap 932 aligned with and conjoined to a corresponding outer portion of the right flap 942. The first, left foot well 35 and the second, right foot well 45 are shown for reference. In this embodiment, the left flap 932 meets the right flap 942 along a center line of the horizontal portion of the tunnel 20. The left flap 932 has a plurality of flaring tenons and mortises 934 associated with a dovetail joint and the right flap 942 has a corresponding plurality of complementary flaring tenons and mortises 944 for a dovetail joint that join along a seam 927 and runs longitudinally with the vehicle tunnel 20 at a junction of the tunnel 20 and the right mat portion 930. There is no overlapping section in this embodiment.

Figure 10:
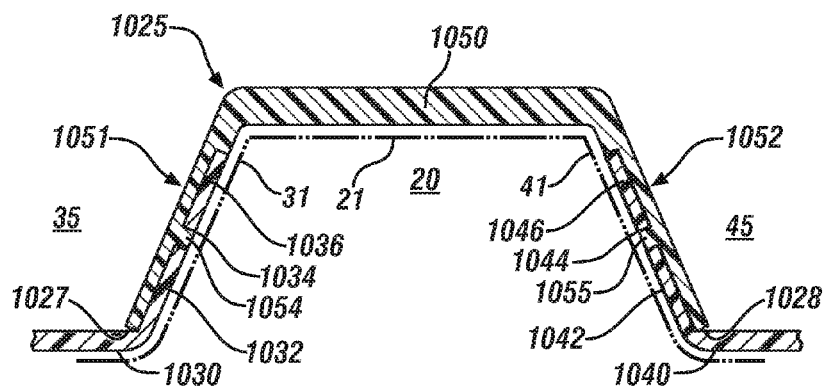
FIG. 10 schematically shows an end view of a portion of an embodiment of the removable floor mat assembly that includes a left mat portion including a left flap, a right mat portion including a right flap and a detachable interconnecting flap, in accordance with the disclosure.

FIG. 10 schematically shows an end view of a portion of another embodiment of the removable floor mat assembly 1025, which includes a left mat portion 1030 including a left flap 1032, a right mat portion 1040 including a right flap 1042 and a detachable interconnecting flap 1050. The vehicle tunnel 20 including the top portion 21 and the left and right side portions 31 and 41, the first, left foot well 35 and the second, right foot well 45 are shown for reference. The interconnecting flap 1050 includes a first side 1051 that aligns with an outer portion of the left flap 1032 and a second side 1052 that aligns with a corresponding outer portion of the right flap 1042. The left flap 1032 preferably extends up a vertical portion of a left side of the tunnel 20 to conjoin with the first side 1051 of the interconnecting flap 1050, and the right flap 1042 preferably extends up a vertical portion of a right side of the tunnel 20 to conjoin with the second side 1052 of the interconnecting flap 1050. As shown in this embodiment, a first seam 1027 is formed by the junction of the left flap 1032 and the first side 1051 of the interconnecting flap 1050, and a second seam 1028 is formed by the junction of the right flap 1042 and the second side 1052 of the interconnecting flap 1050. The first and second seams 1027, 1028 run longitudinally with the vehicle tunnel 20 on the corresponding sides of the vertical portion of the tunnel 20. In this embodiment, the left mat 1030 includes left flap 1032 and a plurality of female interlocking fasteners 1034 that underlap and assemble onto corresponding male interlocking fasteners 1054 on the first side 1051 of the interconnecting flap 1050. The right mat 1040 includes right flap 1042 and a plurality of female interlocking fasteners 1044 that underlap and assemble onto corresponding male interlocking fasteners 1055 on the second side 1052 of the interconnecting flap 1050. The right flap 1042 includes an underlap portion 1046 that extends underneath the first side 1051 of the interconnecting flap 1050, and the left flap 1032 includes an underlap portion 1036 that extends underneath the second side 1052 of the interconnecting flap 1050.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A removable protective floor liner for a rearward seating area of a passenger compartment of a vehicle including a first foot well separated from a second foot well by an intervening tunnel, the floor liner comprising:
   - a molded first floor mat section configured for installation in the first foot well of the rearward seating area and including a first flap;
   - a molded second floor mat section configured for installation in the second foot well of the rearward seating area and including a second flap;
   - the first flap including a plurality of tenons and mortises;
   - the second flap including tenons and mortises that are complementary to the tenons and mortises of the first flap;
   - the first and second flaps being able to cover the tunnel between the first and second floor mat sections; and
   - the tenons and mortises of the first flap being mated with the tenons and mortises of the second flap when the first and second flaps are aligned;
   - wherein the tenons and mortises of the first flap are mated with the tenons and mortises of the second flap in a non-overlapping configuration.

2. The removable protective floor liner of claim 1, wherein a seam is formed by the alignment of the first and second flaps, the seam running longitudinally with the tunnel on a top portion of the tunnel.

3. The removable protective floor liner of claim 1, wherein the first floor mat section is separable from the second flap and is removable from the first foot well of the rearward seating area when separated.

4. The removable protective floor liner of claim 1, wherein the tenons and mortises of the first flap are complementary to and disposed to form a dovetail joint with the tenons and mortises of the second flap.

* * * * *